United States Patent
Wang et al.

(10) Patent No.: US 10,306,664 B2
(45) Date of Patent: May 28, 2019

(54) DETERMINISTIC SCHEDULING METHOD ORIENTED TO INDUSTRIAL WIRELESS WIA-PA NETWORK

(71) Applicant: Chongqing University of Posts and Telecommunications, Chongqing (CN)

(72) Inventors: Heng Wang, Chongqing (CN); Ping Wang, Chongqing (CN); Peng Fei Chen, Chongqing (CN); Hang Yang, Chongqing (CN)

(73) Assignee: CHONGQING UNIVERSITY OF POSTS AND TELECOMMUNICATIONS, Chongqing (CN)

(*) Notice: Subject to any disclaimer, the term of this patent is extended or adjusted under 35 U.S.C. 154(b) by 0 days.

(21) Appl. No.: 15/512,318

(22) PCT Filed: Jul. 1, 2016

(86) PCT No.: PCT/CN2016/088239
§ 371 (c)(1),
(2) Date: Mar. 17, 2017

(87) PCT Pub. No.: WO2017/201818
PCT Pub. Date: Nov. 30, 2017

(65) Prior Publication Data
US 2018/0176936 A1    Jun. 21, 2018

(30) Foreign Application Priority Data

May 24, 2016    (CN) .......................... 2016 1 0349863

(51) Int. Cl.
*H04W 72/12*    (2009.01)
*H04W 72/04*    (2009.01)
(Continued)

(52) U.S. Cl.
CPC ....... *H04W 72/1247* (2013.01); *H04W 40/00* (2013.01); *H04W 72/0446* (2013.01);
(Continued)

(58) Field of Classification Search
CPC ... H04W 28/04; H04W 72/04; H04W 72/042; H04W 88/08; H04L 5/0007
See application file for complete search history.

(56) References Cited

U.S. PATENT DOCUMENTS

8,134,964 B2 * 3/2012 Pan ................... H04L 29/12254
                                                 370/329
9,641,289 B2 * 5/2017 Liu ........................... H04L 1/08
(Continued)

*Primary Examiner* — Gbemileke J Onamuti
*Assistant Examiner* — Sanjay K Dewan
(74) *Attorney, Agent, or Firm* — Anova Law Group, PLLC (57) ABSTRACT

The present invention relates to a deterministic scheduling method oriented to an industrial wireless WIA-PA network, and belongs to the technical field of industrial wireless network communication. According to the deterministic scheduling method, in middle and small scale WIA-PA networks, a scheduling solution can be obtained using an optimal deterministic scheduling method based on a backtracking method by establishing a solution space tree for data stream scheduling after part or all of the solution space tree is searched, and an optimal success rate of the scheduling can be obtained; and in a large scale WIA-PA network, the time margin of each time slot is calculated for each data stream using a suboptimal deterministic scheduling method based on least slack first, the scheduling is prioritized according to the time margin, and a scheduling solution can be obtained in a short time at a higher success rate. With the deterministic scheduling method provided by the present invention, both time slots and channel resources can be reasonably distributed for the transmission of respective data streams within the whole network, thereby avoiding the conflict of communication links and solving the deterministic problem of end-to-end data stream transmission across the WIA-PA network.

2 Claims, 5 Drawing Sheets

(51) Int. Cl.
*H04W 40/00* (2009.01)
*H04W 84/12* (2009.01)
*H04W 88/16* (2009.01)

(52) U.S. Cl.
CPC ........ *H04W 72/1242* (2013.01); *H04W 84/12* (2013.01); *H04W 88/16* (2013.01)

(56) References Cited

U.S. PATENT DOCUMENTS

| | | | |
|---|---|---|---|
| 9,705,737 B2* | 7/2017 | Wetterwald | H04L 41/0803 |
| 2003/0117966 A1* | 6/2003 | Chen | H04L 45/02 370/255 |
| 2007/0011660 A1* | 1/2007 | Garyali | G06F 9/445 717/127 |
| 2008/0253327 A1* | 10/2008 | Kohvakka | H04W 16/14 370/330 |
| 2008/0279141 A1* | 11/2008 | Luss | H04L 45/128 370/329 |
| 2010/0202335 A1* | 8/2010 | Borean | H04W 52/02 370/311 |
| 2010/0302992 A1* | 12/2010 | Zhuang | H04W 40/04 370/313 |
| 2014/0281088 A1* | 9/2014 | VanderLeest | G06F 13/26 710/264 |
| 2015/0030011 A1* | 1/2015 | Liu | H04L 1/1893 370/336 |
| 2015/0109926 A1* | 4/2015 | Jin | H04W 40/04 370/235 |

* cited by examiner

DETERMINISTIC SCHEDULING METHOD ORIENTED TO INDUSTRIAL WIRELESS WIA-PA NETWORK

BACKGROUND OF THE INVENTION

Technical Field

The present invention belongs to the technical field of industrial wireless network communication, and relates to a deterministic scheduling method oriented to an industrial wireless WA-PA network.

Description of Related Art

In recent years, an industrial wireless network has been developed rapidly in the industrial automation field due to the features of low cost, high reliability and high flexibility and has become a research hotspot at present. WIA-PA is an industrial wireless network standard for industrial process automation formulated by China independently, and states that the data transmission shall be completed in a limited time and cannot be delayed. To achieve this goal, a deterministic scheduling technology is responsible for reasonably distributing communication resources required by time slot communication for data transmission, allowing an end-to-end data stream transmission manner to follow a communication resource allocation result.

However, the deterministic scheduling issue oriented to the industrial wireless network can be specified as an NP issue ranking first among seven major mathematical conundrums in the world, and the reason why such an issue is difficult to solve generally lies in that a universal polynomial solution method is difficult to find, resulting in that the current scheduling methods at present cannot be applied to different networks directly. A common research method is to look for an approximation algorithm or a probability algorithm thereof, so that a target to be solved approaches a final target solution or the final target solution is obtained correctly at higher success probability. At present, an existing deterministic scheduling method in the field of industrial wireless networks is rare in the WIA-PA network, and is mainly centered in the networks as defined by the WirelessHART standard of the HART Communication Foundation and the ISA100.11a standard of ISA (International Society of Automation). The deterministic scheduling methods for a WirelessHART network and an ISA100.11a network are not suitable for being applied to the WIA-PA network directly since the characteristics of the WIA-PA network are not taken into consideration.

BRIEF SUMMARY OF THE INVENTION

In view of this, an object of the present invention is to provide a deterministic scheduling method oriented to an industrial wireless WIA-PA network, which is capable of adapting to the scenes having different network scales and meeting a deterministic requirement for the end-to-end data stream transmission. The deterministic scheduling method comprises an optimal deterministic scheduling method based on a backtracking method, oriented to middle and small scale WIA-PA networks, and a suboptimal deterministic scheduling method based on least slack first oriented to a large scale WIA-PA network.

To achieve the object above, the present invention provides a technical solution as follows:

a deterministic scheduling method oriented to an industrial wireless WIA-PA network, which comprises an optimal deterministic scheduling method based on a backtracking method, oriented to middle and small scale WIA-PA networks, and a suboptimal deterministic scheduling method based on least slack first, oriented to a large-scale WIA-PA network;

in the middle and small scale WIA-PA networks, a scheduling solution can be obtained using the optimal deterministic scheduling method based on the backtracking method by establishing a solution space tree for data stream scheduling after part or all of the solution space tree is searched, and an optimal success rate of the scheduling can be obtained; and in the large scale WIA-PA network, a time margin of each time slot is calculated for each data stream using the suboptimal deterministic scheduling method based on least slack first, the scheduling is prioritized according to the time margin, and a scheduling solution can be obtained in a short time at a higher success rate; and a deterministic scheduling specific to the data stream is divided into two stages, i.e. an intra-cluster communication stage and an inter-cluster communication stage, the intra-cluster communication stage comprises: generating data periodically by field devices, sending the data to a route device as a cluster head, and collecting and receiving the data of respective field devices by the route device; and the inter-cluster communication stage comprises: forwarding the collected data of the field devices to a next hop of a route device by the route device until the data is forwarded to a gateway device.

Further, the optimal deterministic scheduling method based on the backtracking method, employed in the middle and small scale WIA-PA networks, comprises: expressing all candidate solutions for scheduling the data streams in a solution space tree form specific to each end-to-end data stream, judging whether it is schedulable at the current step at first every time when the solution space tree is searched, if schedulable, proceeding to search from the step; and if unschedulable, backtracking to a preceding step progressively to try other choices, thereby avoiding unnecessary searches; and the specific steps are as follows:

1) establishing a solution space tree for data stream scheduling according to a given number M of available channels and a given time slot number T for superframe communication, wherein each layer of depth of the solution space tree represents a time slot, and first M branches of each layer of depth represents M available channels; each branch corresponds to an offset quantity of one available channel and indicates that a current data stream selects a corresponding channel for communication at the time slot; a M+1 branch indicates that the current data stream is not subjected to any communication link arrangement at the current time slot; therefore, the solution space tree is a M+1 branch tree, and each data stream has M+1 scheduling selections on each layer of depth in the solution space tree;

2) initializing a scheduling result $S[t][c][n]=0$ for all of $t \in [1, T]$, $c \in [0, M-1]$ and $n \in [1, N]$;

3) selecting an unscheduled data stream $F_n$, and searching a scheduling solution from a first layer of depth of the solution space tree from a first time slot at an intra-cluster communication stage;

4) selecting a branch with a channel offset quantity $c=0$ at first all the time for scheduling at each searched time slot $t$, and recording $S[t][c][n]=1$; and during each scheduling, making a schedulability judgment at each scheduling, wherein conditions meeting the schedulability judgment comprise: (1) a current time slot does not exceed a deadline;

(2) the difference between a cut-off time slot and the current time slot is not less than the residual number of hops of a path in which the data stream is located; (3) the current time slot is at an intra-cluster communication stage or inter-cluster communication stage of a corresponding data stream; and (4) if a link is arranged for the current time slot, the link is not in conflict with other existing links;

5) if the current time slot meets all the conditions for the schedulable judgment, determining possibly that a current arrangement for the time slot, channel and data stream are feasible, and entering Step 10); and if the current time slot does not meet any one condition for the schedulable judgment, resetting a scheduling arrangement of the current time slot necessarily, i.e. S[t][c][n]=0, and entering Steps 6) to 8);

6) if the schedulable condition (1) or (2) is not met, determining that the current data stream is unschedulable, conducting backtracking immediately, and entering Step 9) during backtracking;

7) if the schedulable condition (3) is not met, further judging a current communication stage, if a corresponding superframe stage is not reached, making no arrangement to the link; and if the corresponding communication stage is exceeded, determining that the current data stream is unschedulable, conducting backtracking immediately, and entering Step 9);

8) if the schedulable condition (4) is not met, judging whether the current time slot reaches a last time slot of the superframe already at first, if so, conducting backtracking on Step 9); if not, further judging whether links in mutual conflict contain the same communication devices; if the same communication device is contained, making no arrangement to the link at the current time slot for the current data stream; or else, arranging the current data stream in another available channel at the current time slot;

9) during backtracking, returning to an ancestor node layer by layer and selecting another branch to continue searching; when a root node is backtracked to, adjusting the sequence of scheduled data streams, resetting the adjusted data stream to an unscheduled state, and starting Step 3); and when a solution space tree search is completed for the data streams in all full permutation sets, directly returning unschedulable result information;

10) further continuing to search a scheduling solution in depth at the current time slot t=t+1, repeating Steps 4) and 5) until all the time slot and channel scheduling searches are completed for the current data stream; and 11) repeating Steps 3) to 6) until all the time slot and channel scheduling searches are completed for all the data streams, and finally returning a schedulable solution array set as to S[t][c][n].

Further, in the large scale WIA-PA network, the suboptimal deterministic scheduling method employing least slack first comprises: during scheduling, calculating a time margin of each data stream at each time slot, with a value thereof calculated through $\Delta_t = d - t - r_t - \alpha_i$, wherein $\Delta_t$, d, t, $r_t$ and $\alpha_i$ respectively represent the time margin, a cut-off time slot, a current time slot, a residual hop number and a potential conflicting time slot number; wherein the smaller a time margin value calculated, the higher an urgency degree of the data stream is, and the data stream is preferably selected for link arrangement; on the contrary, the higher the time margin value is, the smaller the urgency degree of the data stream is, and the data stream is scheduled after the data stream with smaller time margin; and the specific steps are as follows:

1) at the intra-cluster communication stage, calculating the time margin of holistic scheduling for each cluster with a first time slot at the stage as a start point, wherein since paths passed by the data in the cluster are the same, the time margin needs to be calculated only once at the stage (by taking the intra-cluster data stream with the smallest cut-off time slot for calculation), that is, the time margins of scheduling for all member data streams in one cluster are expressed with one value $\Delta_t$; the smaller the value $\Delta_t$ is, the higher the priority level of the corresponding cluster member data stream, and during the calculation of $\Delta_t$, a necessary condition for the deterministic scheduling as $d - t - r_t \geq 0$ is calculated and judged simultaneously, the data stream can be scheduled successfully as long as the condition is met, or else, an unschedulable result is returned directly;

2) scheduling a cluster with the smallest time margin at first, or scheduling clusters further away from a gateway at first in case of equal time margins, wherein an intra-cluster communication length is a sum of the number of all the data streams of the cluster members; and during scheduling at the intra-cluster stage, a time slot scheduling is conducted according to the sequence of earlier cut-off time, higher period updating speed and higher message priority level in sequence in the cluster since the time margins in the whole cluster are the same in magnitude;

3) further scheduling a cluster with a second smallest time margin specific to another available channel at the current time slot according to the method in Step 2), until the time slot scheduling at the intra-cluster communication stage is completed;

4) at the inter-cluster communication stage, forwarding all the data used for the current cluster member and passing the cluster head, wherein during forwarding, the time margin for scheduling of each data stream is calculated at each time slot, and the scheduling is conducted in an ascending order according to the time margins; and if the time margins are equal, the time slot scheduling is conducted according to the sequence of earlier cut-off time, higher period updating speed and higher message priority level in sequence;

5) further scheduling a data stream with a second smallest time margin specific to another available channel at the current time slot according to the same method, wherein the scheduled data streams are prevented from conflicts at the same time; and once the conflict occurs, a link is not arranged for the data stream with the second smallest time margin, and when the next time slot comes, the next time slot with a further reduced time margin and higher priority level can be more possibly scheduled successfully; and 6) entering a next time slot and repeating Steps 4) to 5) until the forwarding of all the data streams is completed, wherein if a scheduling failure result is returned during scheduling, a user is informed to conduct further treatment, and an optional measure is to change an application requirement of the data stream or switch to the backtracking method to continue the search.

The present invention has the following advantageous effects: the present invention creatively provides an optimal deterministic scheduling method based on the backtracking method specific to the defect that the industrial wireless WIA-PA network lacks a deterministic scheduling method at present, and achieves an optimal scheduling success rate; with this method, a schedulable solution can be obtained successfully in the event that the scheduling solution to the whole network end-to-end data stream exists exactly; to make up for the defect that the optimal deterministic scheduling method based on the backtracking method is longer in an execution time, a suboptimal deterministic scheduling method based on least slack first is further provided, so that the scheduling solution can be obtained at an approximately optimal scheduling success rate while the scheduling solution is rapidly obtained; and the two types of deterministic scheduling methods oriented to the industrial wireless WIA-PA network as provided by the present invention can be used to reasonably allocate the time slot and channel resources for respective data stream transmission and generate a scheduling solution, so that all the devices communicate regularly according to the scheduling solution, avoiding the conflicts of the communication links and solving the deterministic problem in the end-to-end data stream transmission in the WIA-PA network.

BRIEF DESCRIPTION OF THE SEVERAL VIEWS OF THE DRAWINGS

To make the object, technical solution and beneficial effects of the present invention more clear, the present invention provides the following drawings for an illustrative purpose.

DETAILED DESCRIPTION OF THE INVENTION

Preferred embodiments of the present invention will be described below in detail in combination with the drawings.

In the present embodiment, it is assumed that N end-to-end data streams $F=\{F_1, F_2, \ldots, F_N\}$ exist in the WIA-PA network, each data stream is generated by a field device and terminated in a gateway device. The data stream $F_n$ has a cut-off time of d, and is given with a superframe time slot number T and an available channel number M. By executing the deterministic scheduling method, both time slots and channel resources are allocated for respective data streams in the whole network, and a scheduling solution is generated, so that a communication manner among all the devices follows the scheduling solution and meets the deterministic requirement for the end-to-end data stream communication.

1. The optimal deterministic scheduling method based on the backtracking method is employed in middle and large scale WIA-PA networks.

Figure 1:
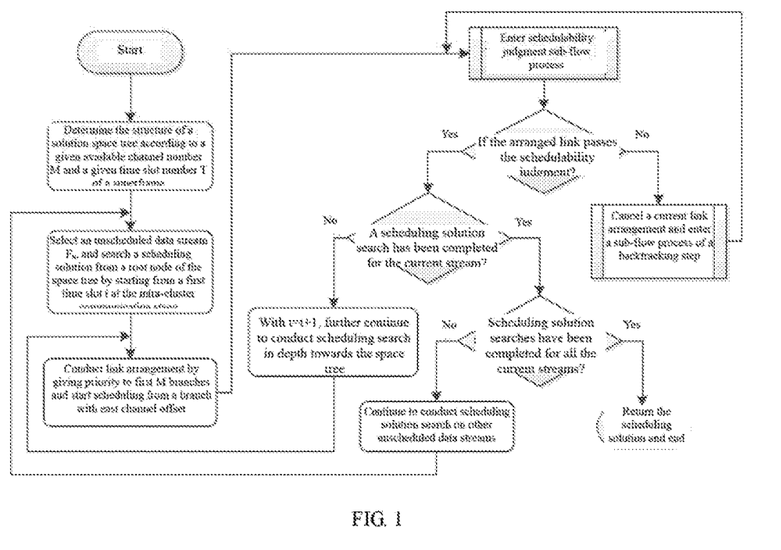
FIG. 1 is a diagram showing a main flow process for implementing an optimal deterministic scheduling method based on a backtracking method according to the present invention.

As shown in FIG. 1, a main flow process for implementing the optimal deterministic scheduling method based on the backtracking method comprises the following steps:

Step 1: Establish a solution space tree for data stream scheduling according to a given number M of available channels and a given time slot number T for superframe communication. Each layer of depth of the solution space tree represents a time slot, and first M branches of each layer of depth represents M available channels. Each branch corresponds to an offset quantity of one available channel and indicates that a current data stream selects a corresponding channel for communication at the time slot. A M+1 branch indicates that the current data stream is not subjected to any communication link arrangement at the current time slot. Therefore, the solution space tree is a M+1 branch tree, and each data stream has M+1 scheduling selections on each layer of depth in the solution space tree.

Step 2: Initialize a scheduling result $S[t][c][n]=0$ for all of $t\in[1, T]$, $c\in[0, M-1]$ and $n\in[1, N]$.

Step 3: Select an unscheduled data stream $F_n$, and search a scheduling solution from a first layer of depth of the solution space tree from a first time slot at an intra-cluster communication stage.

Step 4: Select a branch with a channel offset quantity c=0 at first all the time for scheduling at each searched time slot t, and record $S[t][c][n]=1$. During each scheduling, a schedulability judgment is made at each scheduling. Conditions meeting the schedulability judgment comprise: (1) a current time slot does not exceed a deadline; (2) a difference between a cut-off time slot and the current time slot is not less than a residual number of hops of a path in which the data stream is located; (3) the current time slot is at an intra-cluster communication stage or inter-cluster communication stage of a corresponding data stream; and (4) if a link is arranged for the current time slot, the link is not in conflict with other existing links.

Figure 2:
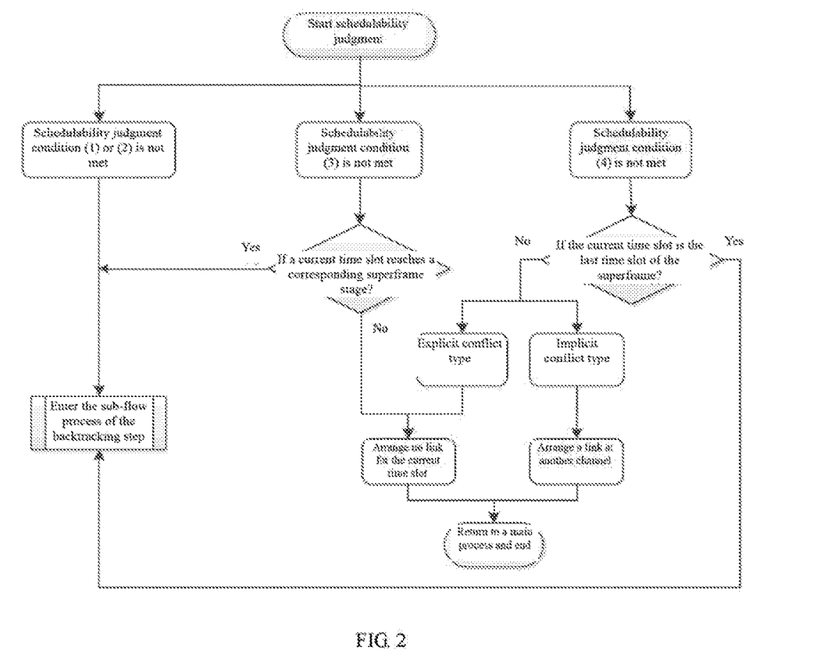
FIG. 2 is a diagram showing a sub-flow process for implementing the optimal deterministic scheduling method based on the backtracking method according to the present invention when a schedulable judging condition is not met.

Step 5: If the current time slot meets all the conditions for the schedulability judgment, determine possibly that a current arrangement for the time slot, channel and data stream are feasible; and further continue to search for a scheduling solution in depth at the current time slot t=+1, and repeat Step 4 until all the time slot and channel scheduling searches are completed for the current data stream. Further repeat Step 4 to Step 5 until all the time slot and channel scheduling searches are completed for all the data streams, and finally return a schedulable solution array set as to $S[t][c][n]$. If the current time slot does not meet any one condition for the schedulable judgment, reset a scheduling arrangement of the current time slot necessarily, i.e. $S[t][c][n]=0$, and enter a sub-flow process implemented when the schedulability judgment condition is not met.

As shown in FIG. 2, the sub-flow process implemented when the schedulable judgment condition is not met comprises the following steps:

Step 1. If the schedulable condition (1) or (2) is not met, determine that the current data stream is unschedulable, and conduct a sub-flow process for implementing a backtracking step immediately.

Step 2. If the schedulable condition (3) is not met, further judge a current superframe stage, if a corresponding superframe stage is not reached, make no arrangement to the link; and if the corresponding communication stage is exceeded, determine that the current data stream is unschedulable, and conduct the sub-flow process for implementing the backtracking step immediately.

Step 3. If the schedulable condition (4) is not met, judge whether the current time slot reaches a last time slot of the superframe already at first, if so, conduct the sub-flow process for implementing the backtracking step; and if not, further judge whether links in mutual conflict contain same communication devices. If the same communication devices are contained, make no arrangement to the link at the current time slot for the current data stream; or else, arrange the current data stream in another available channel at the current time slot.

Figure 3:
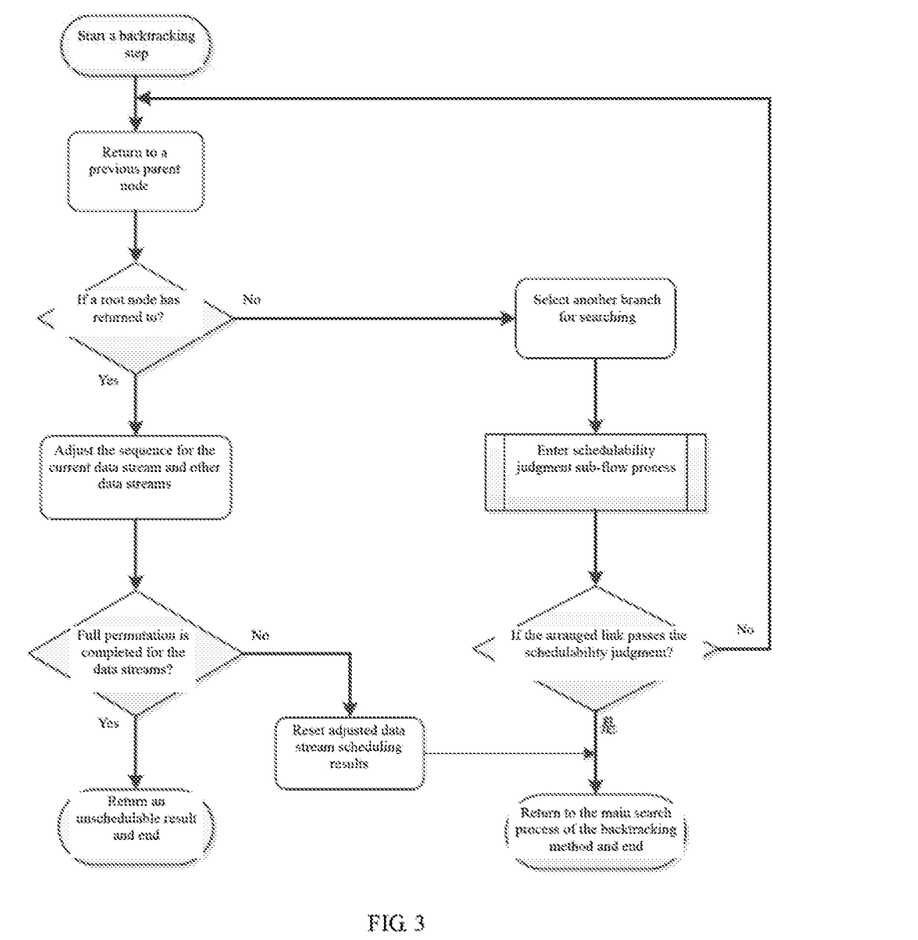
FIG. 3 is a diagram showing a sub-flow process for implementing a backtracking step of the optimal deterministic scheduling method based on the backtracking method according to the present invention.

As shown in FIG. 3, when the sub-flow process for implementing the backtracking step is conducted, an ancestor node layer is returned to by layer and another branch is selected to continue searching. When a root node is backtracked to, the sequence of scheduled data streams is adjusted, the adjusted data streams are reset to an unscheduled state, and Step 3 is started. When a solution space tree search is completed for the data streams in all full permutation sets, unschedulable result information is directly returned.

II. The suboptimal deterministic scheduling method based on least slack first is employed in a large scale WIA-PA network.

Figure 4:
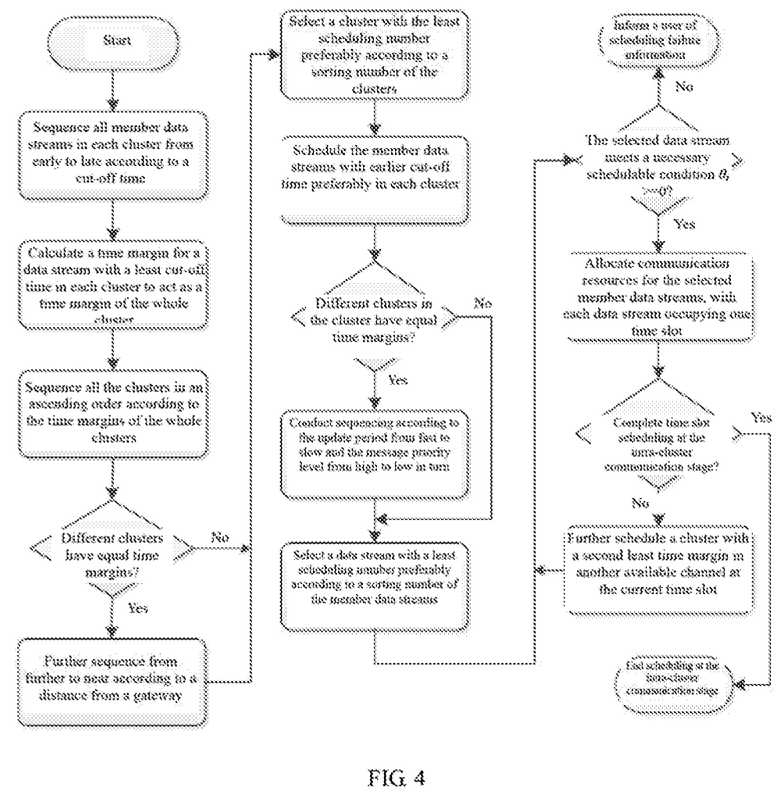
FIG. 4 is a diagram showing a flow process for implementing a suboptimal deterministic scheduling method based on least slack first according to the present invention at an intra-cluster communication stage.

As shown in FIG. 4, a flow process for implementing the suboptimal deterministic scheduling method based on least slack first at an intra-cluster communication stage comprises the following steps:

Step 1: at the intra-cluster communication stage, calculate the time margin of holistic scheduling for each cluster with a first time slot at the stage as a start point. Since paths passed by the data in the cluster are the same, the time margin needs to be calculated only once at the stage (by taking the intra-cluster data stream with the smallest cut-off time slot for calculation), that is, the time margins of scheduling for all member data streams in one cluster are expressed with one value $\Delta_t$. The smaller the value $\Delta_t$ is, the higher a priority level of the corresponding cluster member data stream. During the calculation of $\Delta_t$, a necessary condition for the deterministic scheduling as $d-t-r_t \geq 0$ is calculated and judged simultaneously. The data stream can be scheduled successfully as long as the condition is met. Or else, an unschedulable result is returned directly.

Step 2. Schedule a cluster with the smallest time margin at first, or schedule clusters further away from a gateway at first in case of equal time margins. An intra-cluster communication length is a sum of the numbers of all the data streams of the cluster members. During scheduling at the intra-cluster stage, time slot scheduling is conducted according to the sequence of earlier cut-off time, higher period updating speed and higher message priority level in sequence in the cluster since the time margins in the whole cluster are the same in magnitude.

Step 3. Further schedule a cluster with a second smallest time margin specific to another available channel at the current time slot according to the method in Step 2), until the time slot scheduling at the intra-cluster communication stage is completed.

Figure 5:
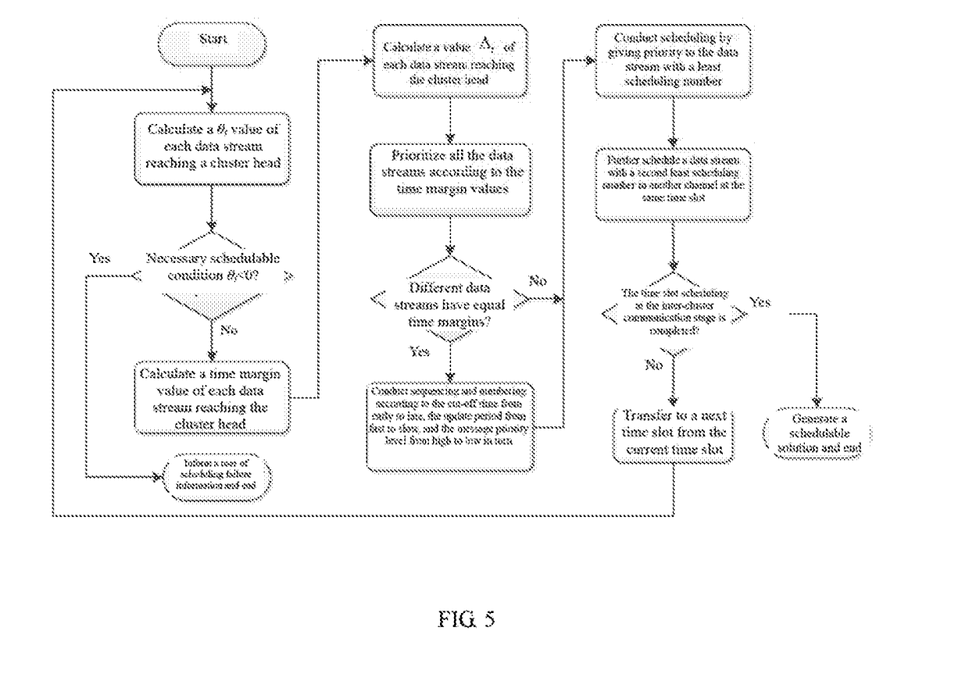
FIG. 5 is a diagram showing a flow process for implementing the suboptimal deterministic scheduling method based on least slack first according to the present invention at the inter-cluster communication stage.

As shown in FIG. 5, a flow process for implementing the suboptimal deterministic scheduling method based on least slack first at an inter-cluster communication stage comprises the following steps:

Step 1. At the inter-cluster communication stage, forward all the data used for a current cluster member and passing the cluster head. The length thereof is not less than the sum of the number of these data streams required to be forwarded. During forwarding, the time margin for scheduling of each data stream is calculated at each time slot, and the scheduling is conducted in an ascending order according to the time margins. If the time margins are equal, the time slot scheduling is conducted according to the sequence of earlier cut-off time, higher period updating speed and higher message priority level in sequence.

Step 2. Further schedule a data stream with a second smallest time margin in another available channel at the current time slot according to the same method, wherein the scheduled data streams are prevented from conflicts at the same time. Once the conflict occurs, a link is not arranged for the data stream with the second smallest time margin, and when the next time slot comes, the next time slot with a further reduced time margin and higher priority level can be more possibly scheduled successfully.

Step 3. Enter the next time slot and repeat Steps 1 to 2 until the forwarding of all the data is completed. If a scheduling failure result is returned during scheduling, the user is informed to conduct further treatment, and an optional measure is to change an application requirement of the data stream or switch to the backtracking method to continue the search.

It should be stated finally that the preferred embodiments above are only used for illustrating rather than limiting the technical solution of the present invention. Although the present invention is described in detail through the preferred embodiments above, those skilled in the art should understand that a variety of changes can be made to them in form and in detail without departing from the scope defined by the claims of the present invention.

What is claimed is:

1. A deterministic scheduling method oriented to an industrial wireless WIA-PA (wireless networks for industrial automation process) network, comprising:
performing, by a combination of field devices, a router device, and a gateway device in the industrial wireless WIA-PA network, a deterministic scheduling to data streams for both middle and small scale WIA-PA networks and a large-scale WIA-PA network, using an optimal deterministic scheduling method based on a backtracking method, oriented to the middle and small scale WIA-PA networks, and a suboptimal deterministic scheduling method based on least slack first, oriented to the large-scale WIA-PA network, wherein
in middle and small scale WIA-PA networks, a scheduling solution is obtained using the optimal deterministic scheduling method based on the backtracking method by establishing a solution space tree for scheduling the data streams after at least a part of the solution space tree is searched and a success rate of the scheduling is obtained; and
in the large scale WIA-PA network, a time margin of each time slot is calculated for each data stream using the suboptimal deterministic scheduling method based on least slack first, and the deterministic scheduling is prioritized according to the time margin to provide a scheduling solution within a reduced time duration at an increased success rate,
the deterministic scheduling specific to one data stream comprising: an intra-cluster communication stage and an inter-cluster communication stage,
the intra-cluster communication stage comprising:
generating data periodically by field devices,
sending, by the field devices, the data to a router device as a cluster head, and
collecting and receiving, by the router device, the data of each field device of the field devices; and
the inter-cluster communication stage comprising:
forwarding, by the router device, the collected data of the field devices to a next-hop router device until the data is forwarded to a gateway device; and
wherein the optimal deterministic scheduling method based on the backtracking method, employed in the middle and small scale WIA-PA networks, comprises:
expressing all candidate solutions for scheduling the data streams in a solution space tree form a specific data stream to each end-to-end data stream, and every time when the solution space tree is searched up, firstly judging whether it is schedulable at a current step, when it is schedulable, proceeding to search starting from the current step; and when it is unschedulable, backtracking to a previous step progressively to try different choices, thereby avoiding unnecessary searches by following steps:

1) establishing a solution space tree for scheduling the data streams according to a given number M of available channels and a given time slot number T for superframe communication, wherein each layer of depth of the solution space tree represents one time slot, and first M branches of the each layer of depth represents M available channels; each branch corresponds to an offset quantity of one available channel and indicates that a current data stream selects a corresponding channel for communication at a current time slot; a M+1 branch indicates that the current data stream is not subjected to any communication link arrangement at the current time slot; the solution space tree is a M+1 branch tree, and each data stream has M+1 scheduling selections on the each layer of depth in the solution space tree;

2) initializing a scheduling result S[t][c][n]=0 for all the t∈[1,T], c∈[0,M−1] and n∈[1,N], wherein t denotes the current time slot, c denotes a used channel offset quantity, n denotes a current data stream number, N denotes a data stream number, and S denotes a scheduling solution array;

3) selecting an unscheduled data stream $F_n$, and searching a scheduling solution from a first layer of depth of the solution space tree from a first time slot at an intra-cluster communication stage;

4) selecting a branch with a channel offset quantity c=0 at first for scheduling at each searched time slot t, and recording S[t][c][n]=1; and during each scheduling, making a schedulability judgment at each scheduling, wherein schedulable conditions meeting the schedulability judgment comprise: (1) a current time slot does not exceed a deadline; (2) a difference between a cut-off time slot and the current time slot is not less than a residual number of hops of a path in which the data stream is located; (3) the current time slot is at an intra-cluster communication stage or inter-cluster communication stage of a corresponding data stream; and (4) when a link is arranged for the current time slot, the link is not in conflict with other links;

5) when the current time slot meets all the schedulable conditions for the schedulability judgment, determining possibly that a current arrangement for the time slot, channel and data stream are feasible, and entering Step 10); and when the current time slot does not meet any one condition for the schedulability judgement, resetting a scheduling arrangement of the current time slot by S[t][c][n]=0, and entering Steps 6) to 8);

6) when the schedulable condition (1) or (2) is not met, determining that the current data stream is unschedulable, conducting backtracking immediately, and entering Step 9) during backtracking;

7) when the schedulable condition (3) is not met, further judging a current communication stage, when a corresponding superframe stage is not reached, making no arrangement to the link; and when the corresponding communication stage is exceeded, determining that the current data stream is unschedulable, conducting backtracking immediately, and entering Step 9);

8) when the schedulable condition (4) is not met, judging whether the current time slot reaches a last time slot of the superframe already, if so, conducting backtracking on Step 9), if not, further judging whether links in mutual conflict contain same communication devices; when the same communication device is contained, making no arrangement to the link at the current time slot for the current data stream; or else, arranging the current data stream in another available channel at the current time slot;

9) during backtracking, returning to an ancestor node layer by layer and selecting another branch to continue searching; when a root node is backtracked to, adjusting the sequence of scheduled data streams, resetting the adjusted data stream to an unscheduled state, and starting Step 3); and when a solution space tree search is completed for the data streams in all full permutation sets, directly returning unscheduled result information;

10) further continuing to search a scheduling solution in depth at the current time slot t=t+1, repeating Steps 4) and 5) until all the time slot and channel scheduling searches are completed for the current data stream; and 11) repeating Steps 3) to 6) until all the time slot and channel scheduling searches are completed for all the data streams, and finally returning a scheduling solution array set as to S[t][c][n].

2. The method according to claim 1, wherein:
in the large scale WIA-PA network, the suboptimal deterministic scheduling method employing the least slack first comprises:
during the deterministic scheduling, calculating a time margin of each data stream at each time slot, with a value thereof calculated through $\Delta_t = d - t - r_t - \alpha$, wherein $\Delta_t$, d, t $r_t$ and $\alpha_t$ respectively represent the time margin, a cut-off time slot, the current time slot, a residual hop number and a potential conflicting time slot number; wherein as the time margin value calculated is smaller, an urgency degree of the data stream is higher, and the data stream is selected for the communication link arrangement; as the time margin value is higher, the urgency degree of the data stream is smaller, and the data stream is scheduled after the data stream with a smaller time margin by the following steps:

1) at the intra-cluster communication stage, calculating the time margin of holistic scheduling for each cluster with a first time slot as a start point, wherein since paths passed by the data in the cluster are a same, the time margin needs to be calculated only once at the intra-cluster communication stage by taking intra-cluster data stream with a smallest cut-off time slot for calculation, the time margins of scheduling for all member data streams in one cluster are expressed with one value $\Delta_t$; as the value $\Delta_t$ is smaller, a priority level of a corresponding cluster member data stream is higher, and during the calculation of $\Delta_t$, a condition for the deterministic scheduling as $d-t-r_t \geq 0$ is calculated and judged simultaneously, the data stream is scheduled successfully as long as the condition is met, or else, an unschedulable result is returned directly;

2) scheduling a cluster with a smallest time margin, or scheduling clusters further away from a gateway firstly in a case of equal time margins, wherein an intra-cluster communication length is a sum of numbers of all the data streams of cluster members; and during scheduling at the intra-cluster communication stage, a time slot scheduling is conducted according to a sequence of earlier cut-off time, higher period updating speed and higher message priority level in sequence in the cluster since the time margins in a whole cluster are a same in magnitude;

3) further scheduling a cluster with a second smallest time margin specific to another available channel at the current time slot according to Step 2), until the time slot scheduling at the intra-cluster communication stage is completed;

4) at the inter-cluster communication stage, forwarding all the data used for a current cluster member and passing a cluster head, wherein during forwarding, the time margin for scheduling of each data stream is calculated at each time slot, and the scheduling is conducted in an ascending order according to the time margins; and when the time margins are equal, the time slot scheduling is conducted according to the sequence of earlier cut-off time, higher period updating speed, and higher message priority level in sequence;

5) further scheduling a data stream with the second smallest time margin specific to another available channel at the current time slot, meanwhile avoiding conflicts with the scheduled data streams; and once a conflict occurs, a link is not arranged for the data stream with the second smallest time margin, and when a next time slot comes, the next time slot with a further reduced time margin and higher priority level is scheduled; and 6) entering the next time slot and repeating Steps 4) to 5) until forwarding of all the data streams is completed.

* * * * *